United States Patent [19]

McNamee, Jr.

[11] 4,327,619
[45] May 4, 1982

[54] SAW TABLE

[76] Inventor: John J. McNamee, Jr., 516 Guyer Dr., Haddon Heights, N.J. 08034

[21] Appl. No.: 95,315

[22] Filed: Nov. 19, 1979

Related U.S. Application Data

[63] Continuation of Ser. No. 882,600, Mar. 2, 1978, abandoned.

[51] Int. Cl.³ .......................... B27B 5/20; B27B 9/04
[52] U.S. Cl. ............................... 83/471.3; 83/467 R; 83/486.1; 83/522; 83/564; 83/581
[58] Field of Search ................ 83/522, 471.2, 471.3, 83/486.1, 574, 563, 564, 581

[56] References Cited

U.S. PATENT DOCUMENTS

| | | | |
|---|---|---|---|
| 2,596,524 | 5/1952 | Birdwell | 83/563 |
| 2,803,271 | 8/1957 | Shaw | 83/522 |
| 2,903,026 | 9/1954 | Frydenlung | 83/467 |
| 3,130,758 | 4/1964 | McKinley | 83/486.1 |
| 3,450,177 | 6/1969 | Siegal et al. | 83/471.3 |

*Primary Examiner*—Donald R. Schran
*Attorney, Agent, or Firm*—Thomas A. Lennox

[57] ABSTRACT

A cutting table for cutting house siding is provided for use with a power saw held on a guide rotated to make miter cuts and hold the sheet on the table and against the rail. The guide swings free and folds off the table surface when mitered cuts are not necessary. A second guide may be folded onto the table surface to hold the power saw and cut at a 90° angle to the rail.

14 Claims, 7 Drawing Figures

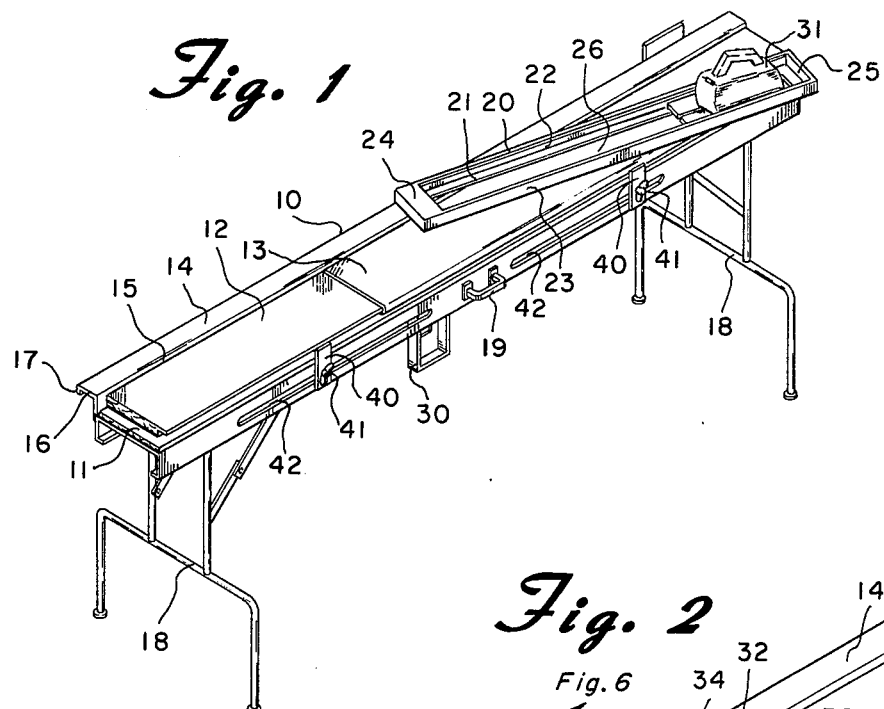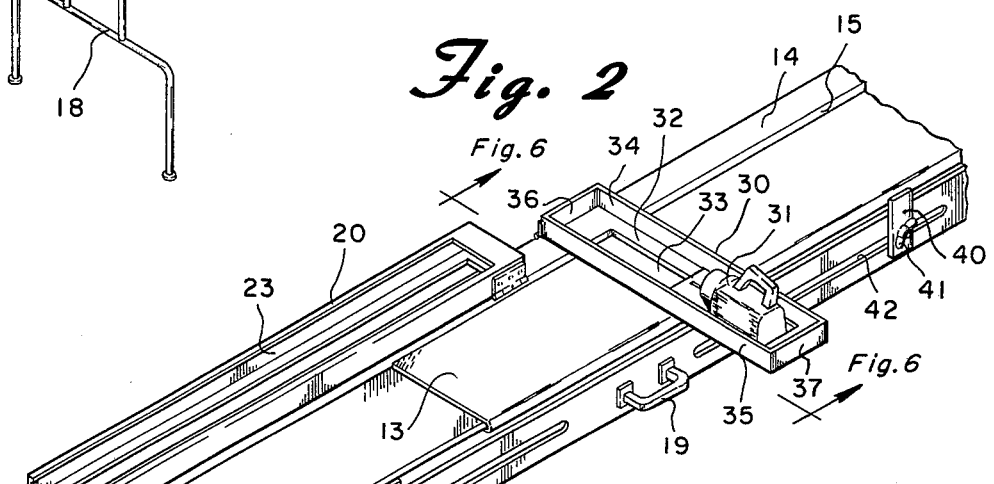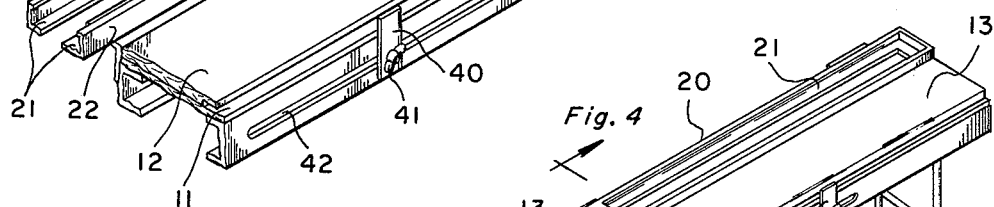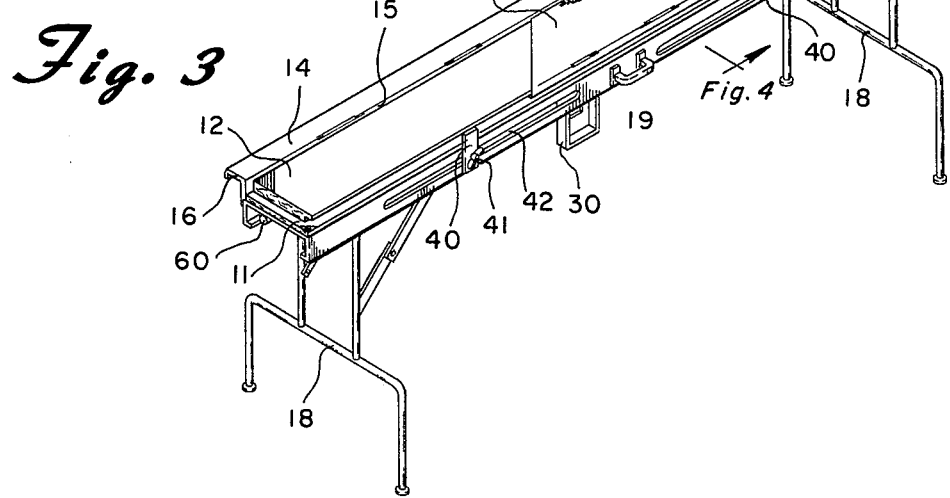

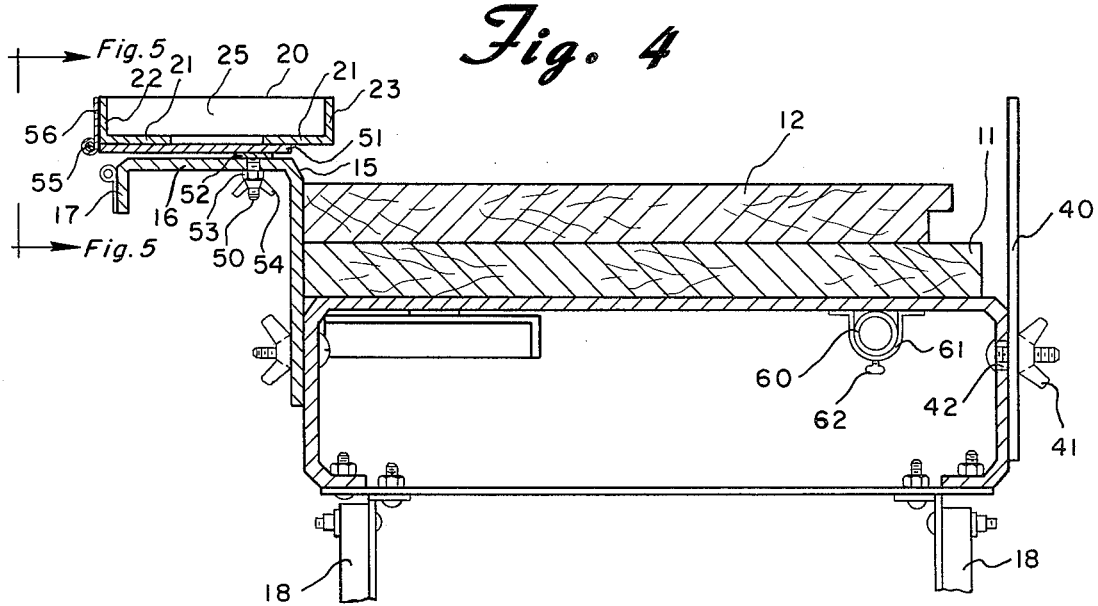
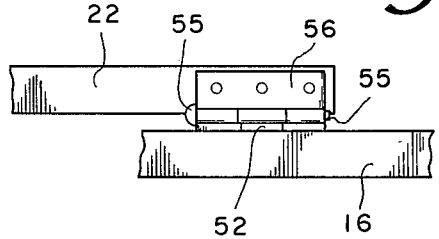
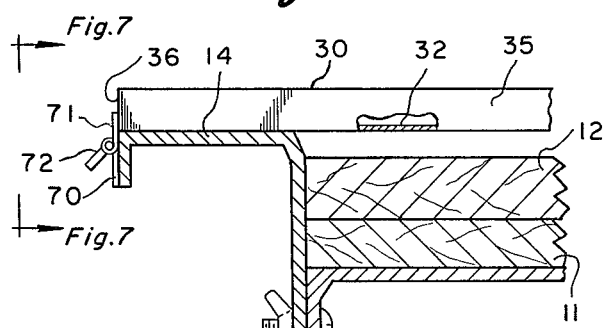
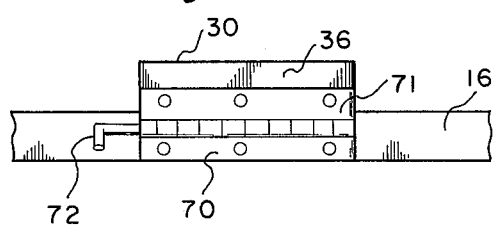

SAW TABLE

This application is a continuation of U.S. patent application Ser. No. 882,600 filed Mar. 2, 1978, now abandoned.

BACKGROUND OF THE INVENTION

Saw guides for providing mitered cuts by power saws are described in U.S. Pat. No. 1,111,904 to L. A. Kahrs and U.S. Pat. No. 2,881,525 to J. R. Johnston. More recently guides for power saws such as hand held rotary saws are described in U.S. Pat. No. 3,717,064 to N. Shelton. A saw guide using a wheeled dolly is described in U.S. Pat. No. 3,389,724 to B. M. Paul.

Most recently, saw tables have been provided to Tapco Products Co., Inc. and Van Mark Corporation, both of Detroit, Mich. One of these tables is severely limited as to its ability to provide mitered cuts at small angles and the other utilizes a center rotating saw track which has a tendency to be damaged in hard use.

None of these products alone or in any combination provide a saw table which is durable for use in the field and yet provides accurate mitered cuts which are required for many building operations such as that of the installation of house siding, such as aluminum, vinyl covered steel, plastic and other compositions. It is an object of this invention to fill these needs.

It is an object of this invention to provide a table long enough to easily support lengths of house siding and allow a single operator to safely and accurately cut the siding not only at 90° angles but at almost any angle to match the roof line or other angle on the side of the house.

It is also an object of this invention to provide a cutting table which will allow an easy and quick change from the standard 90° cross-cut to an angle cut and back again to the 90° cut, without requiring any significant adjustment in the table.

It is an additional object of this invention to provide a durable saw guide construction which will allow cutting panels at any angle desired with only one hand on the power saw and without the necessity of attempting to hold the panel being cut.

It is an object of this invention to provide a saw table which can easily be set to cut a particular miter cut and then easily cut as many pieces as necessary at that angle without the necessity of any re-setting.

It is an additional object of this invention to provide a saw table which can be used with great safety and without the necessity of touching the table or the part being cut during the sawing process.

These objects and other advantages, of the present invention will become apparent through a full reading of the following disclosure.

SUMMARY OF THE INVENTION

This invention relates to a cutting table which may be used for cutting objects of any shape, but is particularly suited for relatively long sheets or panels composed of metal, wood, plastic or composition materials that are used in the construction industry. While the table is suitable for cutting many objects of many shapes, including sheets, rods, tubes, duct work and bars, the specification will generally refer to sheet material and more specifically to metal siding, such as aluminum or steel siding or to plastic siding, all for use on the outside of residential homes. These references in no way are intended to limit this invention to that particular use, other than to indicate that this invention is particularly suited to that use.

The saw table includes a table with a surface onto which one or more sheets of siding is placed. The surface is longer than it is wide, the difference in dimensions dependant upon the shape of the sheets or materials to be cut. For example, for aluminum siding, the table is usually five to six times as long as it is wide.

A back-stop rail is provided along the rear edge of the length of the table surface such that the sheets to be cut, held against the back-stop rail will be parallel to the length of the table surface.

A miter saw guide is provided onto which a power saw is placed and caused to slide along the length of that guide with the saw blade extending downwardly through the guide to engage and cut the sheets in position on the table surface. The guide is pivoted in a horizontal plane to allow the saw cut to be at essentially any angle to the backstop rail.

Guides along the length of the miter saw guide prevent the saw from slipping off the saw guide and provide a positive guide for straight line cutting as the saw is slid along the horizontal plate.

A saw guide attachment connects the miter saw guide to the back stop rail and allows it to be held above the table surface so that the sheet to be cut may be placed on the table under the miter saw guide. A holding system, preferably part of the attachment system, allows the saw guide to be pressed downwardly on the sheet to be cut holding it to the table surface and against the back stop rail. A pivot system interconnected with the saw guide attachment allows the saw guide to be pivot in a horizontal plane at angles to the back stop rail. Finally, at least one pitch stop is provided adjustable to any chosen pitch of the miter cut against which the saw guide means is held during the cutting process.

BRIEF DESCRIPTION OF THE DRAWINGS

FIG. 1 is a perspective drawing of the cutting table of this invention with the miter guide means in a position to cut material at a relatively narrow angle.

FIG. 2 is a partial perspective view of the cutting table of this invention wherein the miter guide has been swung to a position generally off the surface of the table to allow the 90° guide to be in position for cutting the sheet material with a power saw.

FIG. 3 is a perspective drawing of the cutting table of this invention wherein the miter guide is swung to a position such that panel already cut may be removed.

FIG. 4 is a cross-sectional view along lines 4—4 of FIG. 3 showing the hinged construction of the miter guide.

FIG. 5 is a partial rear view of the hinged mechanism of the miter guide and part of the hinge system for the 90° angle guide.

FIG. 6 is a partial cross-sectional view along lines 6—6 of FIG. 2 showing the hinged attachment of the 90° angle guide in cutting position.

FIG. 7 is a partial rear view of the hinged attachment of the 90° angle guide.

DESCRIPTION OF PREFERRED EMBODIMENTS

The preferred miter guide includes parallel horizontal plates having a slot space between the plates wide enough for the saw blade to fit without coming in contact with the plates when a power saw is placed and slides along these parallel plates. Edge rails are provided along the outside edges of the parallel plates so as to prevent the power saw from inadvertently sliding off the plates and to provide a guide on either edge to allow a straight cut. End edge rails are provided so that the power saw is not pushed off the parallel plates. The rear end edge rail is located at the end of the miter guide attached to the cutting table.

The miter guide system is attached to the saw table by a pivot system which includes an upright pivot pin which allows rotation of the miter guide in a horizontal plane above the top of the back stop rail on the table. It will be apparent that this pivotal attachment system can be accomplished in a variety of means. It is critical that the miter guide system be able to rotate horizontally to various angles with the back stop rail and also to allow sufficient play in the attachment system to allow the miter guide to be pressed downwardly onto the piece being cut. One method of this attachment is through a horizontal strap rigidly attached to the pivot pin so that it rotates with the pin as it pivots in a hole through the top of the back stop rail. A vertical hinge system is connected to the end of the horizontal strap which is, in turn, hingably connected to an upright strap rigidly connected to the outside surface of one of the edge rails close to the end of the miter guide.

In this pivot attachment system, the hole in which the pivot pin rotates is positioned near the front edge of the top of the back stop rail. The horizontal strap extends to the edge of the miter guide and hingably connects to the miter guide edge rail. This is preferred in order to fold back the miter guide completely off the surface of the table. However, a pivot pin directly connecting the top of the edge rail and the miter guide would be effective to carry out the purposes of this invention so long as there is sufficient play in the connection between the edge rail and the miter guide to allow the miter guide to be pressed onto the work piece. It is contemplated and included in this attachment system that the miter guide be sufficiently ductile that it will bend under pressure to meet with the work piece. A preferred method of obtaining this play is to provide an attachment which will not bind against the back stop rail and thus allow the miter guide end to be easily pressed against the work piece. In the preferred embodiment, the position of the pivot pin with respect to the front edge of the top of the edge rail is important. The positioning close to the front edge allows a small amount of play to be magnified along the length of the edge rail, thus a play of about 1/16th of an inch at the pivot pin will allow sufficient play at the other end to reach the work piece without difficulty.

An important embodiment of the invention is to provide at least one pitch stop and preferably at least two pitch stops on the front edge of the table. These pitch stops are horizontally positionable along the front edge of the table and provide a stop for a particular pitch chosen for the particular job such as the roof angle. The height of the pitch stop must be sufficient to allow the miter guide system to be firmly held against the stop during the cutting process. Since there is some vertical play possible for that end of the miter guide system, it is preferred that the pitch stop be of such a height that the miter guide may be lifted over the stop to the other side for piece removal or for using another pitch stop. For convenience, a scale may be scribed or marked on the front of the table to show the various settings of the pitch stops to cut various angles.

It will be apparent that, after placing the siding sheet to be cut on the form board and adjusting the pitch stop, that the person cutting, with only one hand, will be able to press downwardly on the cutting saw and to the left or right holding the guide against the pitch stop, be able to make the cut without touching the work piece. In this manner, a completely safe cut may be obtained with essentially no possiblity of the free hand being cut by the saw. It is not necessary to hold the piece being cut, the saw guide or the pitch stop with the other hand during the cutting process.

FIG. 1 shows cutting table 10 in the working position with top working surface 11. A separate form board 12 to prevent inadvertent bending of the thin siding sheets is provided. The form board 12 is here chosen to conform to the shape of aluminum siding but may be chosen in any form to protect the shape of the thin sheets being cut on table 10. Aluminum siding sheet 13 is placed on form board 12, which is the exact shape of the siding, and up against back stop rail 14. Back stop rail 14 includes a vertical wall 15 against which aluminum siding 13 is forceably held. The height of vertical wall 15 is sufficient to accomodate materials to be cut on the table without interfering with the horizontal swing of miter guide 20 but not so high as to allow the sheet or sheets to be cut to be too far from the miter guide 20 and prevent holding down the sheet through the downward pressure on miter guide 20.

Back stop rail 14 also includes horizontal top 16 onto which miter guide 20 is pivotally connected. Vertical downward lip 17 is part of back stop rail 14 which provides for attachment of 90° guide 30 (partially hidden).

Leg system 18 is capable of being folded back to allow ease of carrying with handle 19 and ease of storage when not in use.

Miter guide 20 includes plate 21 on which a power saw 31 is placed and caused to slide along plate 21 to engage the sheet 13 and be pulled back to be clear of the cut pieces. In FIG. 1, the part of plate 21 nearest the viewer is partially hidden and may be more easily viewed in FIG. 2. The size of plate 21 as bordered by edge rails 22 and 23 is preferably the same width as the face plate of the power saw being used. In this fashion, the power saw will ride along both edge rails 22 and 23 during the cutting process. This is an advantage in that either edge rail 22 or edge 23 may be held against pitch stop 40 without changing the sidewise position of the power saw cutting blade. Edge rails 22 and 23 are welded to plate 21 to prevent power saw 31 from inadvertently going off the edge of miter guide 20. Edge rails 22 and 23 provide a positive guide so that when power saw 31 is slid along pressed against one of the edge rails an accurate straight cut is made. Rear end rail 24 is provided to prevent the saw blade from reaching and cutting into back stop rail 14. Front edge rail 25 prevents saw 31 from slipping off the front end of miter guide 20. Slot space 26 through plate 21 is sufficient to allow the blade of saw 31 to engage sheet 13 to be cut but narrow enough to prevent the power saw face plate from slipping through.

In FIG. 1 miter guide 20 is shown in the approximate position to cut a relatively sharp angle across the aluminum siding sheet 13. Cutting table 10 is easily capable of cutting siding at an angle for a roof pitch of as low as 2 feet in 12 feet while competitive systems having difficulty cutting any angle less than a pitch of 5 feet in 12 feet. Guide 30 for 90° cuts is shown in its foldback position out of the way and in a position such as it does not interfere with cutting with the miter guide 20.

Pitch stops 40 are held by thumb screws 41 in horizonal slots 42 at any chosen pitch for accurate positioning of miter guide 20. For clarify, miter guide 20 is shown a distance away from pitch stop 40, but in actual use, would be pivoted to the left and held against pitch stop 40 during the cutting process. In that cutting position, the operator would press with one hand on saw 31 downwardly and to the left. With that single pressure maintained throughout the cutting process and repositioning of the saw 31 after the cut is completed, edge rail 23 is held against pitch stop 40 to maintain the proper angle and the bottom of miter guide 20 is pressed against sheet 13 to hold it in position during the entire cutting process.

In FIG. 2, miter guide 20 has been swung away from the working position such that it is off of table surface 11. In this perspective view of miter guide 20, most of the surface of plate 21 is shown. In this position miter guide 20 will not interfere with the use of optional 90° angle guide 30, which is shown in the normal cutting position. Power saw 31 is resting on plate 32 although the near portion is partially hidden in this view. The blade of power saw 31 extends through slot 33 to engage panel 13 and cut it at a 90° angle. Panel 13 is held on form board 12 and abutted against vertical surface 15 of back stop rail 14. Edge rails 34 and 35 prevent power saw 31 from falling off plate 32 and provide positive guidance to make a straight cut. Back rail 36 and front rail 37 prevent power saw 31 from leaving guide 30 until the cutting position is completed.

In FIG. 3 miter guide 20 is pivoted off the table surface so as to allow the removal of the cut piece 13 and insertion of the next sheet to be cut. Guide 30 is also folded back and is partially hidden. This position is used when miter guide 20 is to be used next and that the only need is to remove the cut pieces and the insertion of the new sheet before the next operation. The position of pitch stop 40 remains unchanged so that a plurality of sheets can be cut at the same pitch, such as along a roof line, without requiring any setting. If an angle cut is necessary on one side and a 90° cross-cut is necessary on the other end of the sheet, it is an easy task to set a second pitch stop 40 toward the center of table 10 and merely lifting miter guide 20 over the right hand pitch stop 40 and resting it against the pre-set cross-cut pitch stop to the left and making the second cut without having to re-set any portion of the table. While saw 31 is not shown on guide 20, it can remain there while the cut pieces are removed and the new sheet inserted.

FIG. 4 is a cross-sectional view taken along lines 4—4 of FIG. 3 showing miter guide 20 in the position almost completely off the table surface 11. Form board 12 is provided to prevent crushing of fragile shapes such as aluminum siding which fits around the shoulder. Edge rails 22 and 23 are welded to plate 21 as is front edge rail 25. Miter guide 20 is attached to top 16 of back stop rail 14 through pivot pin 50 welded to strap 51. Strap 51 is ⅛ inch steel extending at least one half of the width of plate 21 so as to allow pin 50 to pivot against vertical surface 15 of back stop rail 14. Strap 51 and thus miter guide 20 are allowed to rotate 360° in a horizontal plane on washer 52 held in place by nut 53 and lock thumb nut 54 on the threaded portion of pin 50. Nuts 53 and 54 are tightened together to loosely hold pin 50 in position without tightening against top 16 so as to allow a free rotation and some vertical play, preferably about 1/32 inch, to about ⅛ inch. Strap 51 is hingably connected through pin 55 to vertical strap 56 which is welded to the outside of rail 22. By this mechanism, miter guide 20 may be folded out of the way or may be placed in any angle to provide miter cuts. Pitch stop 40 is held in position by wing nut 41. Extension arm 60 is a one inch steel pipe which is pulled out to extend the normal length of table 11 when long sheets require additional support. Extension 60 is held in guides 61 (most are hidden) by thumb screw 62.

FIG. 5 is a rear view of the hinge system and connecting system for the miter guide 20. Vertical hinge strap 56 welded to edge 22 is hingably connected through pin 55 to horizontal strap 51, pivoting on washer 52.

FIG. 6 is a partial cross-sectional view along lines 6—6 of FIG. 2 showing guide 30 in operating position. End rail 36 of guide 30 welded to hinge strap 71 which is hingably connected through pin 72 to hinge strap 70 which in turn is welded to vertical extension 17 of rail 14. FIG. 7 is a rear view of the hinge connection system for guide 30 showing pins 72 partially removed to allow hinge straps 70 and 71 to be disconnected for removal of guide 30.

While this invention has been described with reference to the specific embodiments disclosed herein, it is not confined to the details set forth and the patent is intended to include modifications and changes which may come within and extend from the following claims.

I claim:
1. A saw table comprising:
  (a) A table having a surface the length of which is substantially longer than the width capable of holding metal, wood, plastic or composition sheets substantially in the form of building siding, the table having a front edge and a rear edge, both along the length of the table,
  (b) a back stop rail substantially along the entire length of the rear edge, having a top extending above the table surface,
  (c) a power saw guide means comprising:
    (1) a horizontal plate having a width at least that of the power saw face plate,
    (2) a slot the length of the horizontal plate wide enough to allow the power saw blade to extend downwardly through the slot and below the horizontal plate, and
    (3) edge guide means along the length of the horizontal plate to prevent the saw from slipping off the saw guide and to provide a positive straight line cutting guide,
  (d) a saw guide attachment hinge means to attach saw guide means at one end to the top of back stop rail to hold the saw guide means cantilevered over the table surface with sufficient vertical play in the attachment to allow the free end of the saw guide means to be pressed on the sheet to be cut, holding it to the table surface and against the back stop rail,
  (e) a pivot means between the hinge means and rail to allow pivoting the saw guide at angles in a plane horizontal to the back stop rail, and
  (f) a pitch stop means, adjustable to any chosen pitch of the miter cut by which the saw guide means is held during the cutting process.

2. The saw table of claim 1 wherein the horizontal plate of the power saw guide means is a width equal to that of the face plate of the power saw.

3. The saw table of claim 1 wherein the pivot means comprises an upright pivot pin means swivelly connecting the top of the back stop rail to one end of the saw guide means to allow it to pivot horizontally to various angles with the back stop rail.

4. The saw table of claim 1 wherein the saw guide attachment hinge means comprises a hinge to allow the saw guide means to be hingably swung off and away from the back stop rail when not in use.

5. The saw table in claim 1 wherein the saw guide attachment hinge means and the pivot means comprise
   (a) an upright pivot pin rotating through a hole in the top of the back stop rail,
   (b) a horizontal strap rigidly attached to the pivot pin,
   (c) an upright strap rigidly connected to the outside surface of one of the edge guide means of the power saw guide means and
   (d) a hinge means connecting the end of the horizontal strap to the upright strap to allow the saw guide means to pivot at angles to the back stop rail and be hingably swung off and away from the back stop rail when not in use.

6. The saw table of claim 1 wherein the power saw guide means comprises two edge rails rigidly connected to the outside edges along the length of the plate and extending vertically upward to prevent the saw bearing surface from sliding off the edge of the plate and a front edge rail rigidly connected to the unsupported end of the plate to prevent the saw gearing surface from sliding off the edge of the saw guide means.

7. The saw table of claim 6 wherein the saw guide attachment means comprises
   (a) an upright pivot pin rotating through a hole in the top of the back stop rail,
   (b) a horizontal strap rigidly attached to the pivot pin,
   (c) an upright strap rigidly connected to the outside surface of one of the edge means of the power saw guide means and
   (d) a hinge means connecting the end of the horizontal strap to the upright strap to allow the saw guide means to pivot at angles to the back stop rail and be hingably swung off and away from the back stop rail when not in use.

8. The saw table of claim 1 wherein the pitch stop means is at least one vertical upright arm horizontally adjustably connected to the front edge of the table against which the edge means may be forcably held during the cutting process.

9. The saw table of claim 8 wherein the height of the pitch stop means is sufficient to allow the saw guide means to be lifted over the pitch stop means.

10. The saw table of claim 8 wherein the pitch stop means comprise at least two vertical arms each being able to be horizontally positioned at any chosen point along the front edge of the saw table.

11. The saw table of claim 1 wherein
   (a) a second saw guide means is connected to back stop rail comprising:
      (1) a horizontal plate the width of the power saw face plate and the length slightly longer than the width of the table surface,
      (2) a slot the length of the horizontal plate wide enough to allow the saw blade to extend downwardly through the slot and below the horizontal plate, and
      (3) an edge means around the edges of the horizontal plate to prevent the saw from slipping off the second saw guide and to allow the power saw to be guided perpendicular to the back stop rail, and
   (b) a hinge means attached to the back stop rail and to the second guide means allowing the second saw guide means to be hinged off of and away from the table surface.

12. A saw table comprising:
   (a) a table having a surface the length of which is substantially longer than the width, having a front edge and a rear edge both along the length of the table,
   (b) a back stop rail substantially along the length of the rear edge having a top extending above the table surface,
   (c) a power saw guide comprising:
      (1) a horizontal plate having a width at least equal to that of a power saw base plate,
      (2) a slot along the length of the horizontal plate wide enough to allow a power saw blade to extend downwardly through the slot and below the horizontal plate, and
      (3) vertical edge guide rigidly extending from the outside edges of the horizontal plate to hold the power saw face plate in position on the horizontal plate,
   (d) a saw guide attachment and pivot means comprising a pivot pin swively connecting the top of the back stop rail to one end of the saw guide to allow it to pivot horizontally to various angles with the back stop rail, wherein the attachment of the pivot pin is close to the front edge of the top of the back stop rail and has sufficient play to allow the free end of the saw guide to be pressed downwardly against the sheet to be cut, and
   (e) at least one pitch stop vertical arm capable of being horizontally positioned at any chosen point along the front edge of the saw table extending upwardly a suffcient height to engage the saw guide and hold it at a designated pitch when the guide is pressed downwardly against the part to be cut and against the pitch stop.

13. A saw table comprising:
   (a) a table having a surface the length of which is substantially longer than the width capable of holding metal, wood, plastic or composition sheets substantially in the form of building siding, the table having a front edge and a rear edge, both along the length of the table,
   (b) a back stop rail substantially along the entire length of the rear edge, having a top extending above the table surface,
   (c) a power saw guide means comprising:
      (1) a horizontal plate having a width at least equal to that of a power saw base plate,
      (2) a slot the length of the horizontal plate wide enough to allow a power saw blade to extend downwardly through the slot and below the horizontal plate, and
      (3) edge guide means along the length of the horizontal plate to prevent the saw from slipping off the saw guide and to provide a positive straight line cutting guide,
   (d) a saw guide attachment means to attach one end of the saw guide means to the top of the back stop rail and to hold the free end of saw guide means cantilevered above the table surface,
   (e) a holding means allowing the free end of the saw guide means to be pressed on the sheet to be cut holding it to the gable surface and against the back stop rail, (f) a pivot means connected to the saw guide attachment means to allow the saw guide to pivot in a horizontal plane at angles to the back stop rail, and (g) a pitch stop means, adjustable to any chosen pitch of the miter cut against which the saw guide means is held during the cutting process.

14. The saw table of claim 13 wherein the saw guide attachment means comprises (a) an upright pivot pin rotating through a hole in the top of the back stop rail, (b) a horizontal strap rigidly attached to the pivot pin, (c) an upright strap rigidly connected to the outside surface of one of the edge guide means of the power saw guide means and (d) a hinge means connecting the end of the horizontal strap to the upright strap to allow the saw guide means to pivot at angles to the back stop rail and be hingably swung off and away from the backstop rail when not in use.

* * * * *